United States Patent [19]
Fukushima et al.

[11] Patent Number: 5,876,586
[45] Date of Patent: Mar. 2, 1999

[54] HIGHLY CONDUCTIVE POLYMER COMPOSITION AND METHOD FOR MAKING

[75] Inventors: Motoo Fukushima; Shigeru Mori, both of Usui-gun, Japan

[73] Assignee: Shin-Etsu Chemical Co., Ltd., Japan

[21] Appl. No.: 953,983

[22] Filed: Oct. 20, 1997

[30] Foreign Application Priority Data

Oct. 21, 1996 [JP] Japan ................................. 8-297813

[51] Int. Cl.$^6$ ........................................... C25B 3/00
[52] U.S. Cl. ..................... 205/414; 205/420; 205/688; 556/465
[58] Field of Search .................... 205/414, 420, 205/688; 556/465

[56] References Cited

U.S. PATENT DOCUMENTS

| | | | |
|---|---|---|---|
| 5,120,406 | 6/1992 | Shono et al. | 205/414 |
| 5,516,983 | 5/1996 | Kishimoto et al. | 174/1 |
| 5,540,830 | 7/1996 | Nishida et al. | 205/414 |
| 5,641,849 | 6/1997 | Nishida et al. | 205/420 |

*Primary Examiner*—Arun S. Phasge
*Attorney, Agent, or Firm*—Miller, White, Zelano, & Branigan, P.C.

[57] ABSTRACT

A highly conductive polymer is obtained by electrochemically oxidizing a polysilane.

11 Claims, 2 Drawing Sheets

HIGHLY CONDUCTIVE POLYMER COMPOSITION AND METHOD FOR MAKING

This invention relates to a highly conductive polymer composition comprising an electrochemically oxidized polysilane and a method for preparing the same.

BACKGROUND OF THE INVENTION

Great attention has been paid to conductive organic polymers since the discovery that polyacetylene exerts high electrical conductivity due to electron conduction when it is oxidized or reduced in the presence of electron accepting or donative materials to induce charge transfer reaction. Typical examples of such organic polymers are polyacetylenes, polyphenylenes, polypyrroles, polyanilines and polythiophenes.

These organic polymers, however, are difficult to shape due to insolubility and infusibility. Since a film of such polymer is formed by a gas phase or electrolytic polymerization process, the shape of the film is restricted by the shape of the reactor or electrode. The polymers can be seriously deteriorated by oxidation or reduction. These problems prohibit the practical utilization of the conductive polymers.

Polysilanes are very interesting polymers because of their metallic nature and electron delocalization on silicons as compared with carbon, high heat resistance, flexibility, and good thin film formability although none of them are highly conductive. There are known only a few examples of conductive polysilane which are obtained by oxidizing a polysilane having an amino group in a side chain with iodine or oxidizing it with ferric chloride vapor. The use of such corrosive oxidizing agents restrains the conductive polysilane from finding use as electronic materials.

SUMMARY OF THE INVENTION

Therefore, an object of the invention is to provide a highly conductive polymer composition of polysilane which is made highly conductive without a need for such oxidizing agents as iodine and ferric chloride. Another object of the invention is to provide a method for preparing the highly conductive polymer composition.

We have found that by electrochemically oxidizing a polysilane, it can be converted into a highly conductive polymer which is significantly improved in conductivity and remains flexible without embrittlement after oxidation. If the starting polysilane is soluble in a solvent, it can be formed into a film or coating of any desired shape.

In general, polysilane is an insulator as such. It is known that polysilane can be converted into a conductive polymer by doping it with iodine, ferric chloride, and fluorides such as $SbF_5$ and $AsF_5$. This known method requires expensive, corrosive dopants and complex steps. In contrast, the present invention makes polysilane conductive using an electrochemical oxidation process which is inexpensive and safe. In addition to the eliminated use of corrosive materials and economical advantage, the method of the invention can be monitored so as to achieve conversion into an optimum oxidized state. This ensures efficient preparation of a highly conductive polymer which will find a wider range of application. Accordingly, a highly conductive film or coating with improved shapability is obtained. It is a useful material which will find use in battery electrodes, solar cells, electromagnetic shield housings, and the like.

According to a first aspect of the invention, there is provided a highly conductive polymer composition comprising an electrochemically oxidized polysilane.

According to a second aspect of the invention, there is provided a method for preparing a highly conductive polymer composition comprising the steps of immersing an electrode having a polysilane film borne thereon and a negative electrode in a medium containing a supporting electrolyte, and conducting electricity across the electrodes, thereby electrochemically oxidizing the polysilane film. Preferably the medium contains a copper salt as an auxiliary salt.

BRIEF DESCRIPTION OF THE DRAWINGS

The above and other features and advantages of the invention will be better understood by reading the following description taken in conjunction with the drawings.

DESCRIPTION OF THE PREFERRED EMBODIMENTS

Figure 1:
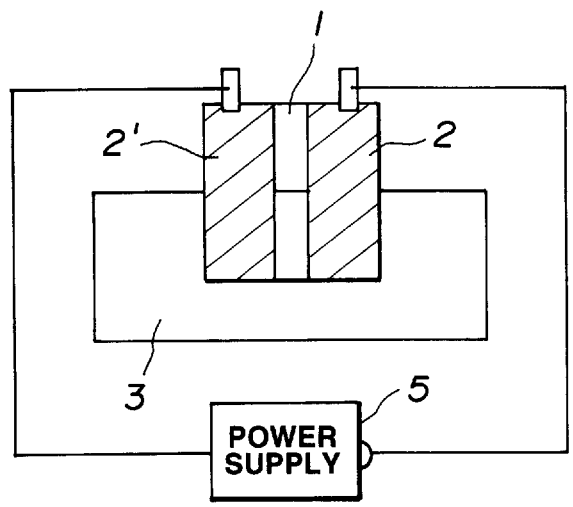
FIG. 1 is a schematic illustration of an arrangement for determining the conditions of electrolytic oxidation of a polysilane film.

The highly conductive polymer composition according to the invention is obtained by electrochemically oxidizing a polysilane. The polysilane used herein is a polymer having a Si—Si bond in which hydrogen atoms, halogen atoms, substituted or unsubstituted aliphatic, alicyclic or aromatic monovalent hydrocarbon groups and/or alkoxy groups are attached to the silicon atoms. Specifically, the polysilane is represented by the following general formula (1):

$$(R^1_m R^2_n X_p Si)_q \qquad (1)$$

wherein each of $R^1$ and $R^2$, which may be identical or different, is hydrogen or a substituted or unsubstituted aliphatic, alicyclic or aromatic monovalent hydrocarbon group; X is $R^1$, an alkoxy group or halogen atom; letters m, n and p are numbers satisfying $1 \leq m+n+p \leq 2$, and q is an integer of $10 \leq q \leq 100,000$.

Formula (1) is described in more detail. The aliphatic or alicyclic hydrocarbon groups represented by $R^1$ and $R^2$ are those having 1 to 12 carbon atoms, preferably 1 to 8 carbon atoms, while the aromatic hydrocarbon groups are those having 6 to 14 carbon atoms, preferably 6 to 10 carbon atoms. Exemplary aliphatic hydrocarbon groups include alkyl, alkenyl, and alkynyl groups; exemplary alicyclic hydrocarbon groups include cycloalkyl and cycloalkenyl groups; and exemplary aromatic hydrocarbon groups include aryl and aralkyl groups. Substituted hydrocarbon groups are those wherein some or all of the hydrogen atoms attached to carbon atoms of unsubstituted hydrocarbon groups are replaced by halogen atoms, amino, alkylamino, or alkoxy groups, for example, p-dimethylaminophenyl.

X represents a group for improving the adhesion of a polysilane film to a substrate. X is typically selected from halogen atoms such as chlorine and alkoxy groups having 1 to 6 carbon atoms such as methoxy and ethoxy although it may be a group as described for $R^1$.

Letters m, n and p are numbers satisfying $1 \leq m+n+p \leq 2$, especially $1.5 \leq m+n+p \leq 2$. Letter q is an integer of $10 \leq q \leq 100,000$, especially $15 \leq q \leq 100,000$. The values of m, n, p, and q are not crucial insofar as the polysilane is soluble in an organic solvent to form a solution which can be coated on a substrate to a uniform thickness in the range of 0.01 to 100 µm. Most often, m, n and p are numbers satisfying $0<m\leq 1$, $0<n\leq 1$, and $0\leq p\leq 1$, especially $0.1\leq m\leq 1$, $0.1\leq n\leq 1$, and $0\leq p\leq 0.5$.

Any desired method may be used to prepare the above-mentioned polysilane. Typically, a polysilane is prepared by adding metallic sodium to toluene in a nitrogen stream, agitating the mixture at a high speed for dispersion while heating at 100° to 120° C., and slowly adding dropwise dichlorodiorganosilane to the agitated dispersion. The amounts of the reactants added are about 2 to 3 mol of metallic sodium and about 1 mol of the silicon compound. The reaction mixture is slowly agitated for about 4 hours until the reactants are consumed, that is, the reaction is completed. The reaction mixture is allowed to cool, passed through a filter to remove the salt, and concentrated, obtaining the polysilane.

In the practice of the invention, any desired process may be used for electrochemically oxidizing the polysilane. One preferred method for electrochemically oxidizing polysilane involves forming a polysilane film on an electrode, immersing the polysilane-bearing electrode and a negative electrode in a medium containing a supporting electrolyte, the polysilane-bearing electrode serving as a positive electrode, and conducting electricity across the electrodes.

One typical electrochemical oxidization process used in the prior art is by dissolving a material to be oxidized in a medium containing a supporting electrolyte, immersing a positive electrode and a negative electrode in the solution, and conducting electricity across the electrodes. This process can be employed in the practice of the invention. To this end, however, a positive electrode region where oxidation occurs and a negative electrode region where reduction occurs must be separated. There is used a separatory cell of complex structure in which a working electrode compartment and a counter electrode compartment are separated by an ion permeation membrane which can cause an increase of solution resistance. This process, however, has the risk that the polymer in the solution can be deteriorated by electrochemical oxidation, resulting in the polymer being gelled or decomposed. The conductivity of the oxidized polymer is not so high in many cases.

In contrast, the present invention advantageously uses an electrochemically oxidizing process involving the steps of forming a polysilane film on an electrode, immersing the polysilane-bearing electrode and a counter electrode in a solution of a supporting electrolyte and an auxiliary salt in an inert solvent, and conducting electricity across the electrodes. With electrolytic oxidation effected by this process, the doped state can be monitored in terms of a change of current flow when a constant voltage is applied and in terms of a change of voltage when a constant current is conducted. Then a conductive material having a desired conductivity value can be prepared.

Electrolysis is carried out in an electrolytic cell having a positive electrode or working electrode and a negative electrode or counter electrode. The electrolytic tank may be made of glass, plastics, ceramics or glass-coated metal. The tank may also be made of a metal if the tank serves as an electrode too. The electrodes are made of conductive materials which are not adversely affected under reaction conditions. Exemplary electrode materials include gold, platinum, silver, copper, stainless steel, silicon, and conductive material-coated glass (e.g., ITO glass).

The supporting electrolyte is preferably a salt corresponding to A–Z wherein A is an inert compatible cation and Z is an inert, compatible, non-coordinate anion. The non-coordinate anion is an anion which when a polysilane is electrolytically oxidized to create a polysilane cation, is incorporated in the polysilane film for establishing electric charge balance, but does not transfer an anionic substituent group or fragment into the polysilane and hence, does not alter the polysilane to be electrically neutral. Exemplary anions are perchlorate, borate, phosphate and sulfonate. Exemplary cations include alkali metal cations such as lithium, sodium and potassium, quaternary alkyl ammonium cations such as tetraethylammonium cation and tetrabutylammonium cation, and quaternary phosphonium cations such as tetrabutylphosphonium cation.

An electrically reducible salt is used as the auxiliary salt. The auxiliary salt is used because oxidation at the positive electrode proceeds more quickly if electrons are quickly consumed at the negative electrode when the polysilane is oxidized at the positive electrode to take up electrons from the polymer. Salts of monovalent and divalent copper are preferred. Typical copper salts are Cu-Y and Cu-Y$_2$ wherein Y is Z defined above or halogen. The copper salt is reduced into copper at the negative electrode.

Some polysilanes allow electrolytic oxidation to proceed quickly even in the absence of the auxiliary salt. For example, oxidation-labile polysilanes such as polysilanes having a hydrogen side chain group can be converted into highly conductive materials through electrolytic oxidation without a need for the auxiliary salt.

The medium used herein is an electrochemically inert one in which the supporting electrolyte is soluble, but the polysilane is difficultly soluble. The type of medium is not definitely determined since the solubility of a polysilane largely varies with its side chain group and decreases with the progress of electrolytic oxidation. Appropriate media are propylene carbonate and ethylene carbonate.

In the process for the electrolytic oxidation of a polysilane, a film of polysilane is first formed on an electrode. The polysilane film can be formed by any of conventional polysilane thin film forming methods, for example, spin coating, dipping, casting, vacuum evaporation, and Langmuir-Blodgett method. Preferred is the spin coating method of applying a polysilane solution onto a rotating member. After spin coating, the coating is dried by keeping it in a dry atmosphere or by allowing it to stand under vacuum at a temperature of about 40° to 60° C. Examples of the solvent in which the polysilane is dissolved include aromatic hydrocarbons such as benzene, toluene, and xylene and ether solvents such as tetrahydrofuran and dibutyl ether. The concentration of the solution is preferably 1 to 20% by weight whereby a polysilane thin film having a thickness of 0.01 to 100 µm can be formed.

Next, the polysilane film-bearing electrode and a counter electrode are immersed in a medium containing a supporting electrolyte and optionally, an auxiliary salt as mentioned above, and electricity is conducted across the electrodes. The electricity conducting method may be either constant voltage or constant current conduction. By monitoring a change of current value in the case of the constant voltage method and a change of voltage value in the case of the constant current method, appropriate electrolytic conditions are empirically determined.

According to the invention, a highly conductive polymer is obtained by using a solvent-soluble polysilane, forming the polysilane into a film or coating of any desired shape, and oxidizing the film or coating by an electrochemical process which eliminates a corrosive factor and is easy to impart conductivity. The oxidized polymer is highly conductive and remains flexible without embrittlement after oxidation. From the highly conductive polysilane composition, a shapable highly conductive film or coating is readily obtainable. The composition is a useful material which will find use in electric, electronic and communications fields as battery electrodes, solar cells, electromagnetic shield housings, and the like.

EXAMPLE

Examples of the invention are given below by way of illustration and not by way of limitation. Mw is a weight average molecular weight and PC is propylene carbonate.

Figure 2:
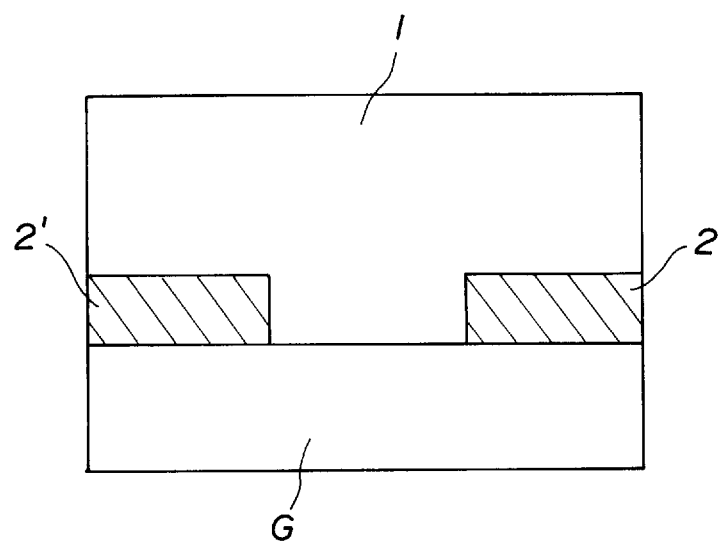
FIG. 2 is a cross-sectional view of a polysilane film.
Figure 3:
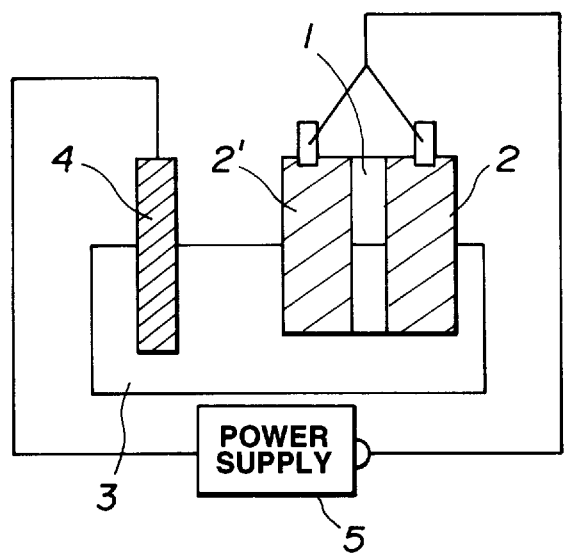
FIG. 3 is a schematic illustration of a system for carrying out electrolytic oxidation of a polysilane film.
Figure 4:
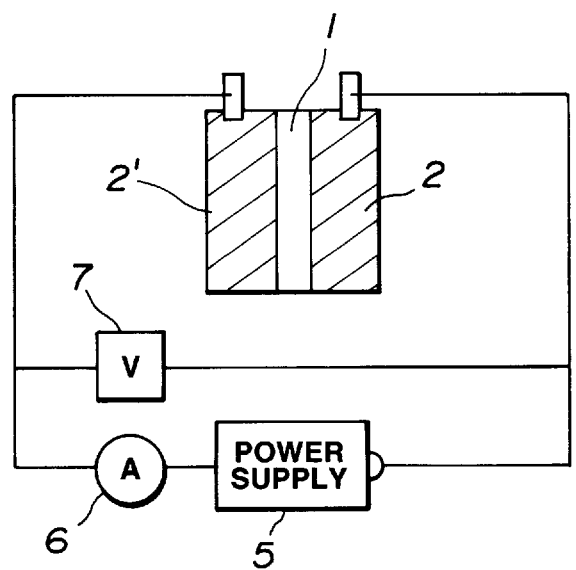
FIG. 4 is a schematic illustration of an arrangement for measuring conductivity.

The procedure of effecting electrolytic oxidation and the procedure of measuring a conductivity used in the following Examples are as shown in the drawings. A sample for conductivity measurement was prepared by evaporating gold on a glass substrate G to form two terminals 2 and 2' as electrodes and spin coating a 10% toluene solution of a polysilane on the glass substrate to form a thin film 1 thereon as shown in FIG. 2. With the right gold electrode 2 and the left gold electrode 2' below the polysilane film 1 made positive and negative electrodes, respectively, the polysilane film 1 was oxidized in an electrolytic solution 3 as shown in FIG. 1 while monitoring a change with time of DC resistance. In this way, electrolytic conditions under which a maximum conductivity was accomplished were empirically determined. Next, the polysilane film 1 with the underlying right and left gold electrodes 2 and 2' and a negative electrode 4 are immersed in the electrolytic solution 3 as shown in FIG. 3, whereupon electricity was conducted across the electrodes 2, 2' and the negative electrode 4 under the empirically determined conditions to carry out oxidation of the polysilane film 1. At the end of oxidation, the right and left gold electrodes 2 and 2' formed below the polysilane film 1 were made positive and negative electrodes, respectively, as shown in FIG. 4, and a conductivity was determined from the resistance value between the two terminals. Also illustrated are a power supply 5, an ampere meter 6, and a volt meter 7.

Synthesis Example 1

(Biphenylethyl)methylpolysilane was prepared as follows.

In a nitrogen stream, 6.9 g (300 mmol) of metallic sodium was added to 150 ml of toluene. The mixture was heated at 110° C. and agitated at a high speed for dispersion. To the agitated dispersion, 29.5 g (100 mmol) of (biphenylethyl) methyldichlorosilane was slowly added dropwise. The reaction mixture was agitated for about 4 hours until the reactants were consumed, that is, the reaction was completed. The reaction mixture was allowed to cool, passed through a filter to remove the salt, and concentrated, obtaining 16.0 g (yield 70%) of a crude polysilane product. The polymer was dissolved in 100 ml of toluene again, to which 300 ml of hexane was added for precipitation. The precipitated polymer was separated, obtaining 2.5 g (yield 11%) of (biphenylethyl)methylpolysilane having a weight average molecular weight of 8,500.

Similarly, phenylmethylpolysilane, dihexylpolysilane, and (p-dimethylaminophenyl)methyl polysilane were prepared.

Synthesis Example 2

Phenylpolysilane was prepared as follows.

In an argon-purged flask, a diethyl ether solution of methyl lithium was added to bis(cyclopentadienyl) dichlorozirconocene to form bis(cyclopentadienyl) dimethylzirconocene catalyst in the system. To the system, phenylsilane was added in an amount of 50 mol per mol of the catalyst. The reaction mixture was heated and agitated at 100° C. for 24 hours. Molecular sieves were then added to the reaction mixture, which was passed through a filter to remove the catalyst. A substantially quantitative amount of phenylpolysilane having a weight average molecular weight of 2,600 was obtained as a solid.

Example 1

A polysilane (phenylpolysilane prepared in Synthesis Example 2) was dissolved in toluene to form a 10% polymer solution. Gold was evaporated on a glass substrate to form two terminals thereon as electrodes. The polymer solution was spin coated onto the glass substrate and dried under 2 mmHg at 50° C., forming a thin film of 0.6 $\mu$m thick. A conductivity measuring sample was obtained in this way. The sample was set in an electrolytic cell circuit as shown in FIG. 3.

Propylene carbonate solutions containing 0.1M/liter of supporting electrolytes as shown in Table 1 were prepared. With the electrode having the polysilane film coated thereon made a positive electrode and a platinum plate made a negative electrode in each solution, a voltage of 5 volts was applied for 30 seconds to effect electrolytic oxidation. The oxidized sample was measured for resistance in the circuit shown in FIG. 4, from which a conductivity was calculated. The conductivity data are shown in Table 1.

Example 2

Conductivity was measured by the same procedure (system containing $Bu_4NBF_4$ supporting electrolyte) as in Example 1 except that phenylmethylpolysilane was spin coated on an electrode and a copper salt $Cu(ClO_4)_2$ or $CuCl_2$ was added to the propylene carbonate solution in different concentrations. The results are shown in Table 2.

Example 3

Various polysilanes spin coated on electrodes were measured for conductivity by the same procedure (system containing 0.01M/liter of the copper salt) as in Example 2. The results are shown in Table 3.

TABLE 1

| Electrolyte | Conductivity (S/cm) of polysilane $\mathrm{+Si+}_n$ with Ph and H substituents |
|---|---|
| blank (prior to electrolytic oxidation) | $\leq 1 \times 10^{-12}$ |
| $Bu_4NClO_4$ | $3 \times 10^{-2}$ |
| $LiClO_4$ | $1 \times 10^{-2}$ |
| $Bu_4NBF_4$ | $3 \times 10^{-2}$ |
| $NaBPh_4$ | $7 \times 10^{-3}$ |

Electrolytic conditions

With the electrode substrate bearing the polysilane film made a positive electrode and platinum made a negative electrode, a voltage of 5 volts was applied.

Electrolytic solution
0.1M of electrolyte per liter of propylene carbonate

TABLE 2

| Polysilane | Electrolytic condition | Copper salt concentration | Conductivity (S/cm) |
|---|---|---|---|
| Ph<br>\|<br>$+Si+_n$<br>\|<br>Me<br>Mw = 46,000<br>0.5 μm | PC<br>Bu$_4$NBF$_4$<br>Cu(ClO$_4$)$_2$ | 0 M/liter<br>0.005 M/liter<br>0.01 M/liter<br>0.02 M/liter<br>0.05 M/liter | $\leq 1 \times 10^{-6}$<br>$3 \times 10^{-4}$<br>$3 \times 10^{-2}$<br>$3 \times 10^{-2}$<br>$2 \times 10^{-2}$ |
|  | PC<br>Bu$_4$NBF$_4$<br>CuCl$_2$ | 0.01 M/liter | $2 \times 10^{-2}$ |

Electrolytic conditions

With the electrode substrate bearing the polysilane film made a positive electrode and platinum made a negative electrode, a voltage of 5 volts was applied.

Electrolytic solution 0.1M of Bu$_4$NBF$_4$ per liter of propylene carbonate an arbitrary amount of Cu(ClO$_4$)$_2$ or CuCl$_2$

TABLE 3

| Polysilane | Mw Film thickness (μm) | Conductivity* (S/cm) |
|---|---|---|
| Ph<br>\|<br>$+Si+_n$<br>\|<br>Me | Mw = 46,000<br>0.5 μm | $3 \times 10^{-2}$<br>($\leq 1 \times 10^{-12}$) |
| Ph<br>\|<br>$+Si+_n$<br>\|<br>H | Mw = 2,600<br>0.6 μm | $3 \times 10^{-2}$<br>($\leq 1 \times 10^{-12}$) |
| Hex<br>\|<br>$+Si+_n$<br>\|<br>Hex | Mw = 125,000<br>0.5 μm | $8 \times 10^{-4}$<br>($\leq 1 \times 10^{-12}$) |
| 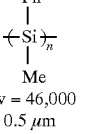 | Mw = 8,500<br>0.7 μm | $2 \times 10^{-2}$<br>($\leq 1 \times 10^{-12}$) |
|  | Mw = 21,000<br>0.4 μm | $8 \times 10^{-2}$<br>($\leq 1 \times 10^{-12}$) |

Electrolytic conditions

With the electrode substrate bearing the polysilane film made a positive electrode and platinum made a negative electrode, a voltage of 5 volts was applied.

Electrolytic solution 0.1M of Bu$_4$NBF$_4$ and 0.01M of Cu(ClO$_4$)$_2$ per liter of propylene carbonate Conductivity values prior to electrolytic oxidation are in parentheses.

Japanese Patent Application No. 297813/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A highly conductive polymer composition comprising an electrochemically oxidized polysilane obtained by electrochemically oxidizing a polysilane of the following formula:

$$(R^1{}_m R^2{}_n X_p Si)_q \quad (1)$$

wherein each of $R^1$ and $R^2$, which may be identical or different, is hydrogen or a substituted or unsubstituted aliphatic, alicyclic or aromatic monovalent hydrocarbon group, X is $R^1$, an alkoxy group or halogen atom, letters m, n and p are numbers satisfying $1 \leq m+n+p \leq 2$, and q is an integer of $10 \leq q \leq 100,000$.

2. A highly conductive polymer composition of claim 1, wherein in the formula (1), $R^1$ and $R^2$ independently are aliphatic or alicyclic hydrocarbon groups of 1 to 12 carbon atoms or aromatic hydrocarbon groups of 6 to 14 carbon atoms each optionally substituted by halogen atoms, amino, alkylamino or alkoxy groups.

3. A method for preparing a highly conductive polymer composition comprising immersing an electrode having a polysilane film borne thereon and a negative electrode in a medium containing a supporting electrolyte, and conducting electricity across the electrodes, thereby electrolytically oxidizing the polysilane film, said polysilane being of the following formula (1):

$$(R^1{}_m R^2{}_n X_p Si)_q \quad (1)$$

wherein each of $R^1$ and $R^2$, which may be identical or different, is hydrogen or a substituted or unsubstituted aliphatic, alicyclic or aromatic monovalent hydrocarbon group, X is $R^1$, an alkoxy group or halogen atom, letters m, n and p are numbers satisfying $1 \leq m+n+p \leq 2$, and q is an integer of $10 \leq q \leq 100,000$.

4. The method of claim 3 wherein said medium comprises a copper salt as an auxiliary salt.

5. A method of claim 3, wherein in the formula (1), $R^1$ and $R^2$ independently are aliphatic or alicyclic hydrocarbon groups of 1 to 12 carbon atoms or aromatic hydrocarbon groups of 6 to 14 carbon atoms each optionally substituted by halogen atoms, amino, alkylamino or alkoxy groups.

6. The method of claim 3, wherein the medium comprises propylene carbonate or ethylene carbonate.

7. A method for preparing a highly conductive polymer composition comprising immersing an electrode having an insulating polysilane film borne thereon and a negative electrode in a medium containing a supporting electrolyte in the form of a salt of the formula A–Z wherein A is an inert compatible cation and Z is an inert, compatible, non-coordinate anion, and conducting electricity across the electrodes, whereby the insulating polysilane is electrochemically oxidized to create a polysilane cation resulting in a highly conductive polysilane film.

8. The method of claim 7, wherein the inert compatible cation, A, is selected from the group consisting of alkali metal cations, quaternary alkyl ammonium cations and quaternary phosphonium cations, and the inert, compatible, non-coordinate anion, Z, is selected from the group consisting of perchlorate, borate, phosphate and sulfonate anions.

9. The method of claim 7, wherein the insulating polysilane is of the formula (1):

$$(R^1_m R^2_n X_p Si)_q \qquad (1)$$

wherein each of $R^1$ and $R^2$, which may be identical or different, is hydrogen or a substituted or unsubstituted aliphatic, alicyclic or aromatic monovalent hydrocarbon group, X is $R^1$, an alkoxy group or halogen atom, letters m, n and p are numbers satisfying $1 \leq m+n+p \leq 2$, and q is an integer of $10 \leq q \leq 100,000$.

10. The method of claim 7 wherein the medium comprises a copper salt as an auxiliary salt.

11. The method of claim 7, wherein the medium comprises propylene carbonate or ethylene carbonate.

* * * * *